(12) United States Patent
Kunce

(10) Patent No.: US 8,632,241 B2
(45) Date of Patent: Jan. 21, 2014

(54) NIGHT LIGHT ELECTRICAL END PLATE

(76) Inventor: Shannon Kunce, Fairfield, IL (US)

( * ) Notice: Subject to any disclaimer, the term of this patent is extended or adjusted under 35 U.S.C. 154(b) by 260 days.

(21) Appl. No.: 12/930,595

(22) Filed: Jan. 10, 2011

(65) Prior Publication Data

US 2012/0176044 A1  Jul. 12, 2012

(51) Int. Cl.
*H01R 33/00* (2006.01)
(52) U.S. Cl.
USPC .......................................... 362/641; 362/642
(58) Field of Classification Search
USPC ................................................ 362/641–642
See application file for complete search history.

(56) References Cited

U.S. PATENT DOCUMENTS 7,758,234 B1 * 7/2010 Savicki et al. ................. 362/641
2007/0171625 A1 * 7/2007 Glazner ........................... 362/95

* cited by examiner

*Primary Examiner* — Sean Gramling
(74) *Attorney, Agent, or Firm* — Peter R. Bahn

(57) ABSTRACT

Disclosed is a standard size electrical end plate with a built in photosensor and light emitting diode (LED), which connect to a power supply/trigger circuit that taps electrical power from a standard electrical box. The photosensor in conjunction with a transistor in the trigger circuit, controls the LED so that when sufficient light is present, no current flows to the LED and it is turned off, and also to insure that when low light conditions are present, current now flows to the LED and it is turned on.

20 Claims, 5 Drawing Sheets

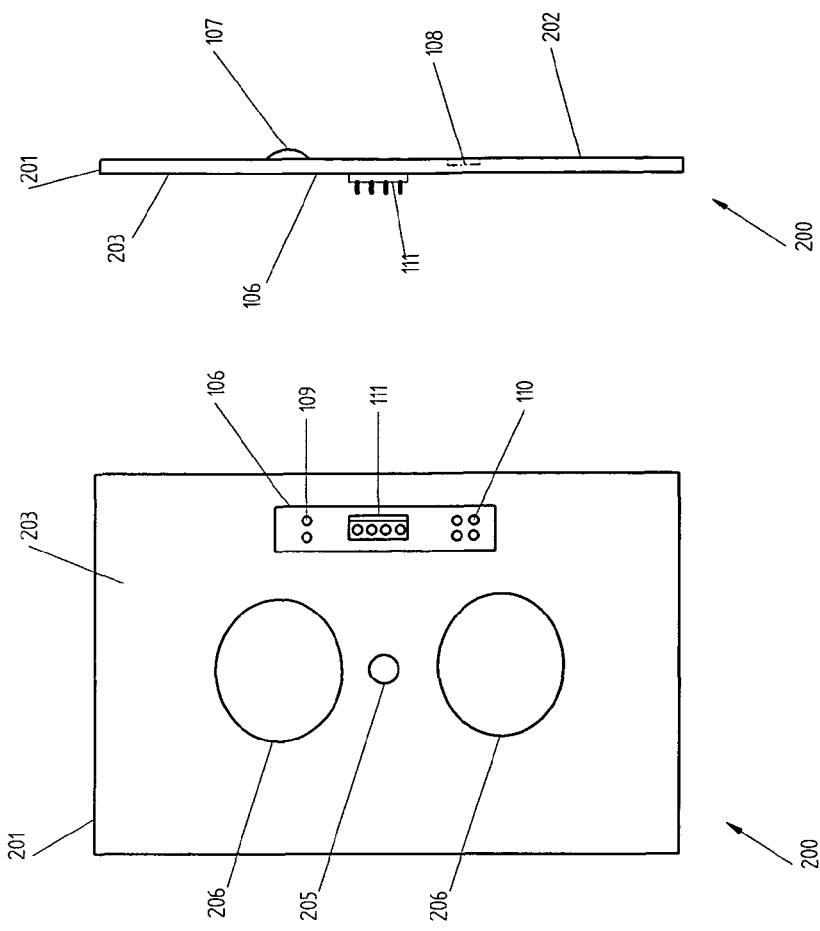
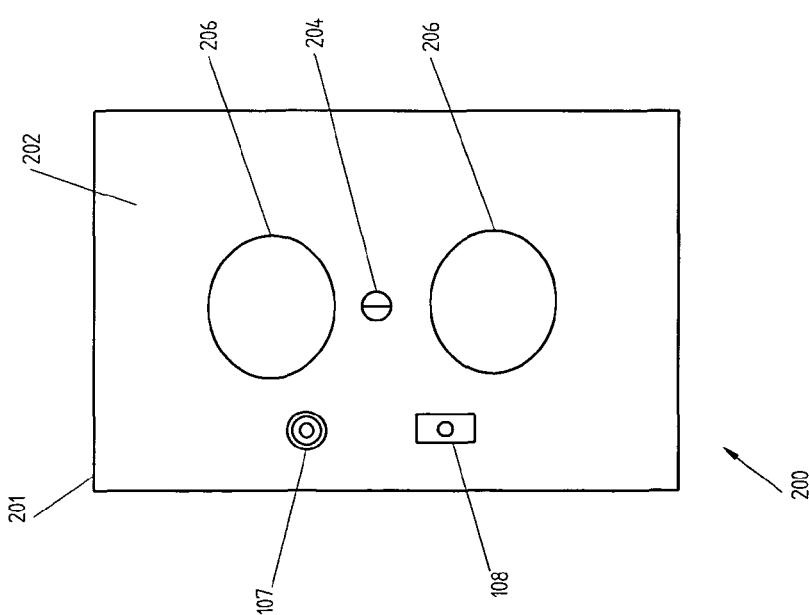
FIG. 2C
FIG. 2B
FIG. 2A

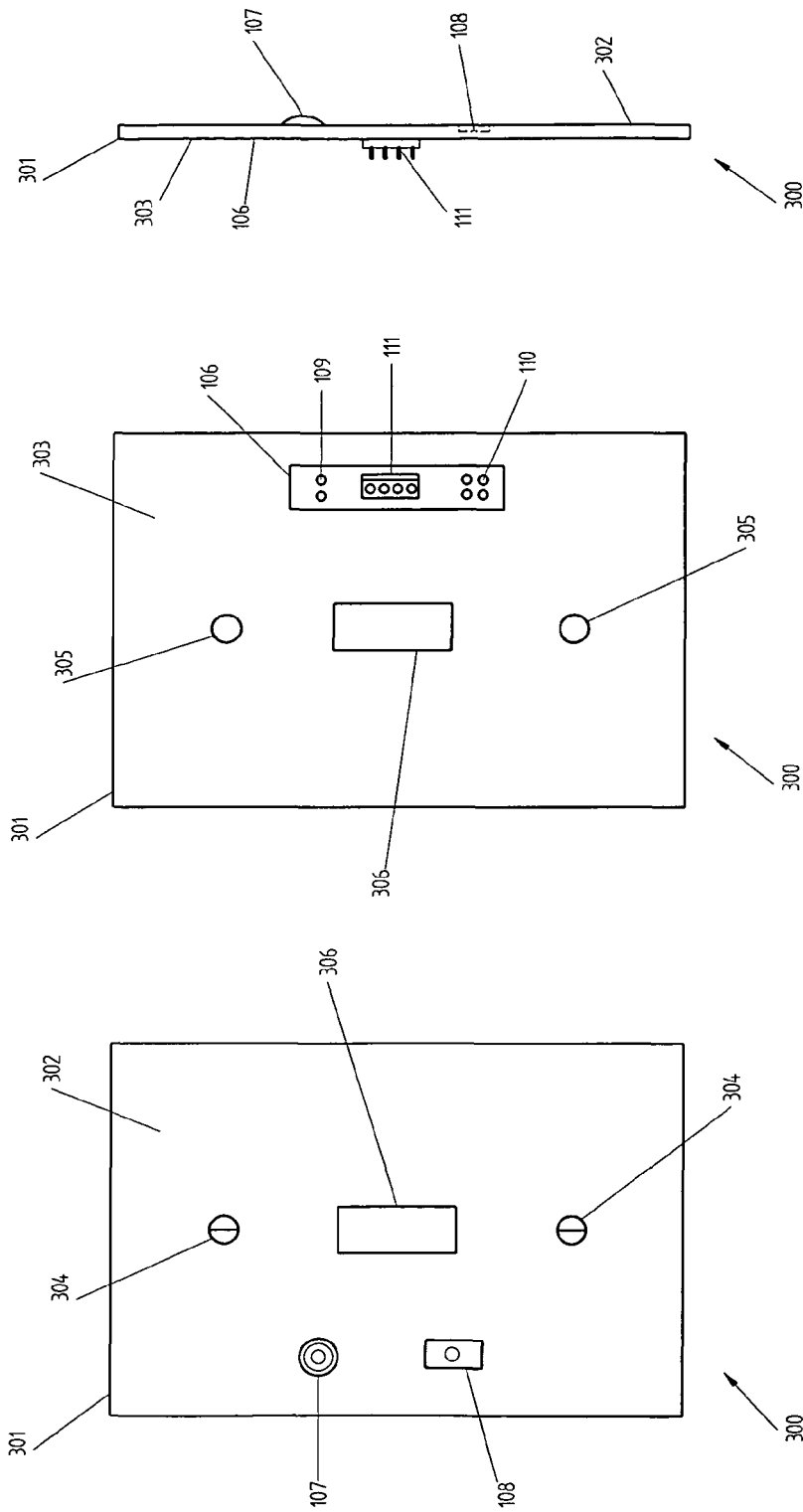

NIGHT LIGHT ELECTRICAL END PLATE

BACKGROUND OF THE INVENTION

Night lights are as old as human civilization, the first night light being a burning torch of combustible material. With the invention of electrical power and with the further invention of light bulbs, an electrical light could be turned on at night when a night light was needed. Batteries also provided a handy, portable source of light at night, when a flashlight could be turned on at the flick of a switch.

With the invention of electrical light sensors, automatic night lights of all sorts were invented. These light sensors were used to sense the amount of ambient light in their immediate environment. When there existed considerable ambient light in the environment as for example during daytime, the sensor and associated electrical circuit would keep electrical current from flowing to an electrical bulb, and the night light would be turned off. When the ambient light fell below a certain level, as in the nighttime, the sensor and associated electrical circuit would now send electrical current to an electrical bulb and the night light would be turned on. The invention of automatic night lights were a common sense invention in that a night light was provided only when needed at dark and turned off when not needed during the daytime, so needless use of electrical power and unnecessary wear and tear on the light bulb was prevented.

There is much prior art in the existing literature and in commerce in the way of night lights. For example, one of the most utilized light sensors is the cadmium sulfide photosensor, which has a high resistance in low light and a low resistance in high light. One of the devices on sale in the commercial marketplace is a dusk-to-dawn 120V AC electrical outlet extension plug controlled by a cadmium sulfide photosensor, such that in the daytime, the extension does not allow 120V AC to flow through the extension plug, but at nighttime, the extension does allow the electrical current to flow through it. Thus, this photosensitive extension turns any lamp that is plugged into it into an automatic night light.

Another piece of relevant prior art on sale commercially is a plug-in night light that has a built-in cadmium sulfide photosensor and built-in incandescent bulb and socket, and which plugs into a standard 120V AC electrical outlet. The photosensor allows the light bulb to turn on at night but turns the light bulb off in normal daylight.

A third piece of relevant prior art commercially on sale is a plug in night light that has a built-in cadmium sulfide photosensor and built-in light emitting diodes (LEDs), and which plugs into a standard 120V AC electrical outlet. The photocell allows the LEDs to turn on at night but turns the LEDs off in normal daylight. LEDs have certain advantages over incandescent light bulbs in that LEDs use less power than incandescent light bulbs to produce an equal amount of light. That is, LEDs are more efficient at producing light than incandescent light bulbs. Also, LEDs are much smaller than light bulbs. Finally, LEDs do not have filaments that wear out frequently like those in light bulbs, so that LEDs last much longer than light bulbs. However, a disadvantage of this prior art device is that standard LEDs are utilized, which such LEDs are rather bulky, being shaped as cylinders with rounded tops with a diameter of 0.5 cm and height of 1.0 cm.

The problem with these prior art night lights is that they are separate units which must be plugged into standard 120V AC electrical outlets to work. In this situation, they take out of operation one of the available electrical outlets from being otherwise usefully available. Also, aside from being of some use at the location of electrical outlet end plates, such plug in night lights are not operational at the locations of either blank electrical end plates or electrical switch end plates. There is a commercially available switch for a switch type end plate in which the switch has an LED embedded in the toggle part of the switch and which aids a person seeing the switch at night so that it can be turned on. However, the LED always stays on and does not turn off at night. Thus, this prior art is not actually an automatic night light, but rather a small light which remains permanently on. Another problem with this prior art is that the LEDs embedded in lit up switch toggles are not very bright, and they provide only enough light for a person to barely make out the location of the toggle. The light from the toggle is not sufficient to light up the area around the light switch such as the floor so as to provide light enough to walk in that area at night.

Another piece of relevant prior art is U.S. Pat. No. 4,546,419 for a wall receptacle night light by Kelli Johnson. Johnson discloses a night light module that does fit into a standard size electrical box and which taps the 120V AC coming into the said electrical box for its power. However, the module utilizes an incandescent light bulb, the filament of which tends to wear out in contrast to LEDs which have no filament to wear out, and which consequently, last much longer. The incandescent light bulb in Johnson's invention draws much more electric current than the LED in the present invention. Also, Johnson's module allows room for only a single electrical outlet when it is placed inside a standard single type electrical box. In contrast, the invention described in this specification allows the use of two electrical outlets when connected to a standard single type electrical box. Another disadvantage of Johnson's invention is that it does not work with a standard type single electrical switch type end plate in conjunction with a standard single type electrical switch box. It will work with a standard double type electrical box which incorporates a switch, but such an electrical box is considerably larger than a single electrical box and corresponding end plate. The present invention described herein does fit into a single type electrical box and corresponding single switch end plate. Another disadvantage of Johnson's invention is that the whole module of her invention is one complete unit in which the end plate is not separable from the power supply/trigger circuit of the device. In the present invention described here, the end plate and the power supply/trigger circuit can be easily unplugged from each other for greater convenience and safety when dealing with the potentially dangerous 120V AC source coming into the electrical box. Thus, in this present invention, it is easy to take off the night light end plate and restore the standard plain end plate if desired, leaving the power supply/trigger circuit with its potentially dangerous 120V AC contacts out of the way, in the back of the electrical box.

Therefore, it is one objective of the present invention to be described herein to provide electrical end plates of either the blank, outlet, or switch types, that possess a built in night light. It is another objective of the present invention that the end plates with a built in night light are such that they can be easily installed to replace standard end plates that do not possess a night light, and that such night light end plates be compatible with standard 120V AC electrical boxes.

Such objectives are achieved with the present invention by virtue of a small compact electronic photosensor/photoemitter circuit that is incorporated into an otherwise standard end plate along with a small compact power supply/trigger circuit that fits into the back of a standard electrical box and that taps into the 120V AC feeding into the said electrical box.

SUMMARY OF THE INVENTION

There are three types of end plates that are used to cover the open ends of electrical boxes embedded in walls: a blank end plate, an outlet end plate, and a switch end plate. This invention is an end plate in which the type does not matter and in which a cadmium sulfide photosensor and light emitting diode (LED) is built in to the end plate by way of a small flat circuit board that attaches to the back of the end plate, and which circuit has a four pronged plug protruding from it. This circuit is referred to as a photosensor/photoemitter circuit.

The four pronged plug inserts into a four pin receptacle which is wired to a small compact power supply/trigger circuit which provides DC to the photosensor/photoemitter circuit. The power supply/trigger circuit is connected by twist caps to the hot and neutral wires providing 120V AC to the electrical box. The power supply/trigger circuit uses a bridge rectifier to convert AC into DC for use by the photosensor and LED. The power supply/trigger circuit is covered with insulating plastic and placed in the back of the electrical box.

The cadmium sulfide photosensor has low resistance in high light and high resistance in low light. These properties are utilized in the combination of the photosensor/photoemitter circuit and the power supply/trigger circuit by virtue of an n-channel mosfet transistor, to insure that when sufficient light is present, no current flows to the LED and it is thus turned off, and also to insure that when the low light conditions are present, current now flows to the LED and it is thus turned on.

A great convenience of this invention is that it is easy to replace a standard end plate with the night light endplate and power supply described here, and utilizing the original standard electrical box in the process.

BRIEF DESCRIPTION OF THE DRAWINGS

FIG. 2A shows a front view of a night light electrical outlet end plate. FIG. 2B shows a back view of a night light electrical outlet end plate. FIG. 2C shows a side view of a night light electrical outlet end plate.

FIG. 3A shows a front view of a night light electrical switch end plate. FIG. 3B shows a back view of a night light electrical switch plate. FIG. 3C shows a side view of a night light electrical switch end plate.

DETAILED DESCRIPTION OF THE INVENTION

Figure 1C:
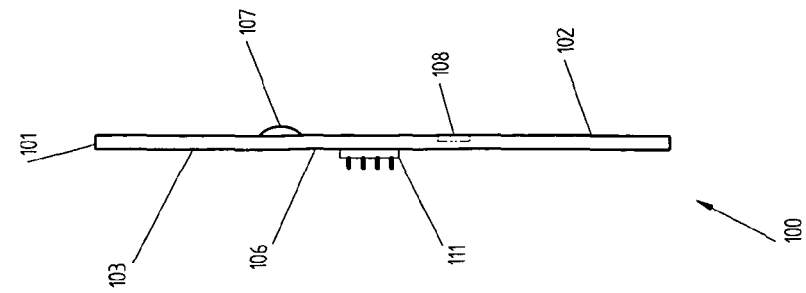
FIG. 1C shows a side view of a night light electrical blank end plate.
Figure 1B:
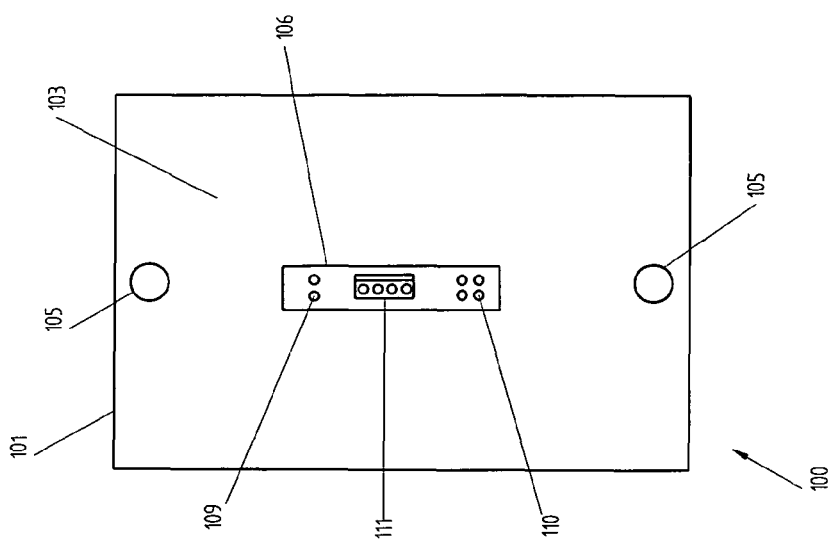
FIG. 1B shows a back view of a night light electrical blank end plate.
Figure 1A:
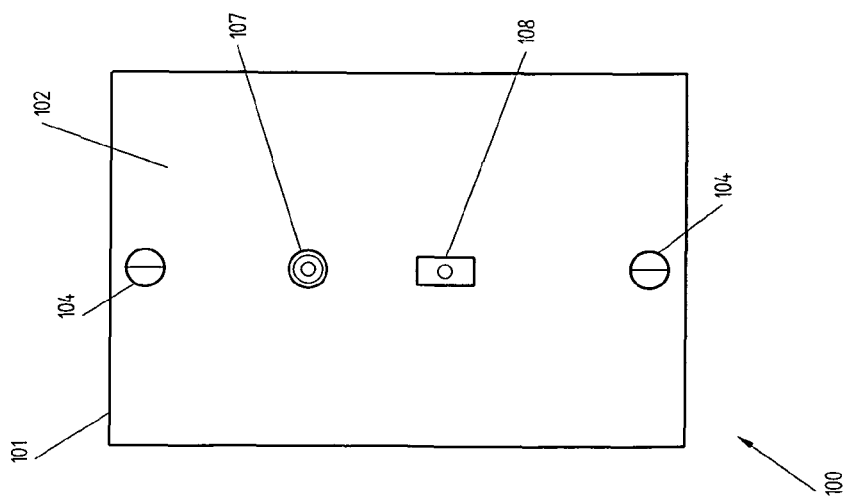
FIG. 1A shows a front view of a night light electrical blank end plate.

In FIGS. 1A, 1B, and 1C, are shown the front, back, and side views, respectively, of a standard 120V AC blank end plate 100 of the type employed in housing construction to cover a standard domestic electric utility box mounted in a wall, and which is not being used for electrical outlets or electrical switches. Such end plates are constructed of plastic, metal, or ceramic materials. The end plate body 101 has a front side 102 and a back side 103. The end plate body is screwed onto a wall by two screws 104, which screw into the electrical box through two holes 105.

Showing through a top hole in the end plate body 101 is a cadmium sulfide photosensor 107. Showing through a bottom hole in the end plate body 101 is a white light emitting diode 108. The photosensor 107 and LED 108 are mounted on a photosensor/photoemitter circuit board 106. The circuit board 106 has mounting holes 109 for the photosensor 107, and also mounting holes 110 for the LED 108. In addition, the circuit board 106 also has a four-pronged plug 111 leading to the circuitry of the photosensor/photoemitter, to be explained later. The photosensor/photoemitter circuit board 106 is mounted to the back 103 of the end plate body 101.

In FIGS. 2A, 2B, and 2C, are shown the front, back, and side views, respectively, of a standard 120V AC outlet end plate 200 of the type employed in housing construction to cover a standard domestic electric utility box mounted in a wall. The endplate body 201 has a front side 202 and a back side 203. The end plate body is screwed onto a wall by a screw 204, which screws into the electrical box through a hole 205.

Showing through a top hole in the end plate body 201 is a cadmium sulfide photosensor 107. Showing through a bottom hole in the end plate body 201 is a white light emitting diode 108. The photosensor 107 and LED 108 are mounted on a photosensor/photoemitter circuit board 106. The circuit board 106 has mounting holes 109 for the photosensor 107, and also mounting holes 110 for the LED 108. In addition, the circuit board 106 also has a four-pronged plug 111 leading to the circuitry of the photosensor/photoemitter. The photosensor/photoemitter circuit board 106 is mounted to the back 203 of the end plate body 201.

In FIGS. 3A, 3B, and 3C are shown the front, back, and side views, respectively, of a standard 120 volt AC switch end plate 300 of the type employed in housing construction to cover a standard domestic electric utility box mounted in a wall. The end plate body 301 has a front side 302 and a back side 303. The end plate body is screwed onto a wall by screws 304. Which screw into the electrical box through holes 305.

Showing through a top hole in the end plate body 301 is a cadmium sulfide photosensor 107. Showing through a bottom hole in the end plate body 301 is a white light emitting diode 108. The photosensor 107 and LED 108 are mounted on a photosensor/photoemitter circuit board 106. The circuit board 106 has mounting holes 109 for the photosensor 107, and also mounting holes 110 for the LED 108. In addition, the circuit board 106 also has a four-pronged plug 111 leading to the circuitry of the photosensor/photoemitter. The photosensor/photoemitter circuit board 106 is mounted to the back 303 of the end plate body 301.

Figure 5:
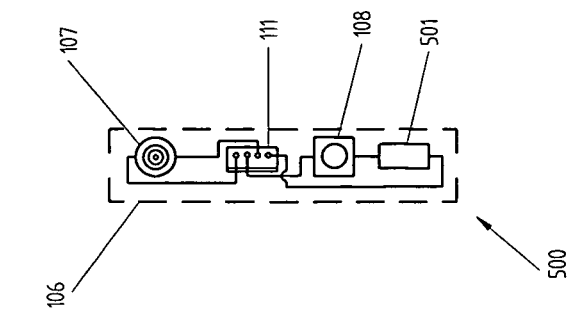
FIG. 5 shows a night light photosensor/photoemitter circuit board with electronic components locations and wiring depicted.
Figure 4:
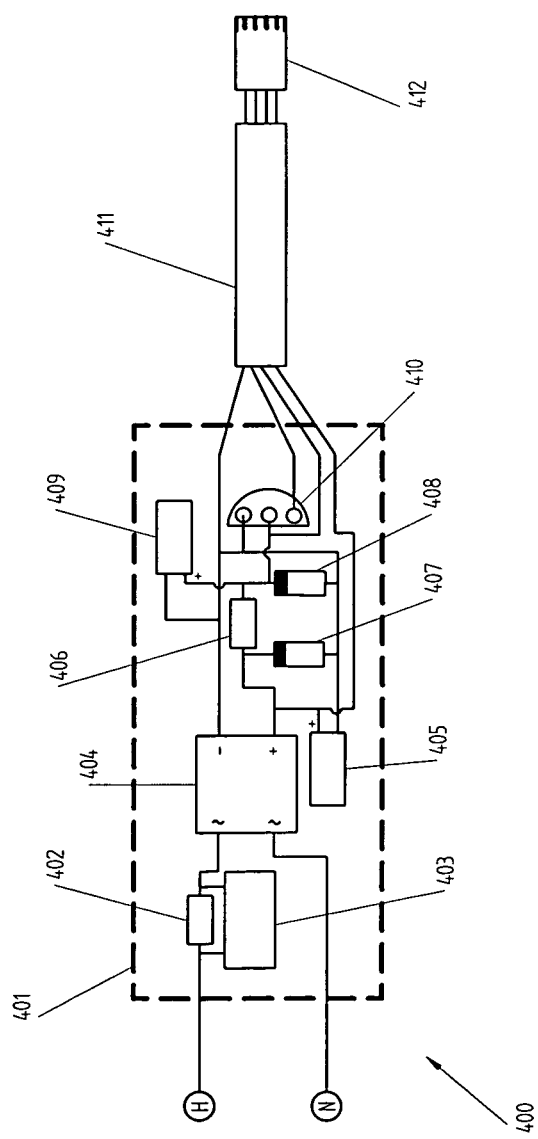
FIG. 4 shows a night light power supply/trigger circuit board with electronic components' locations and wiring depicted.
Figure 6:
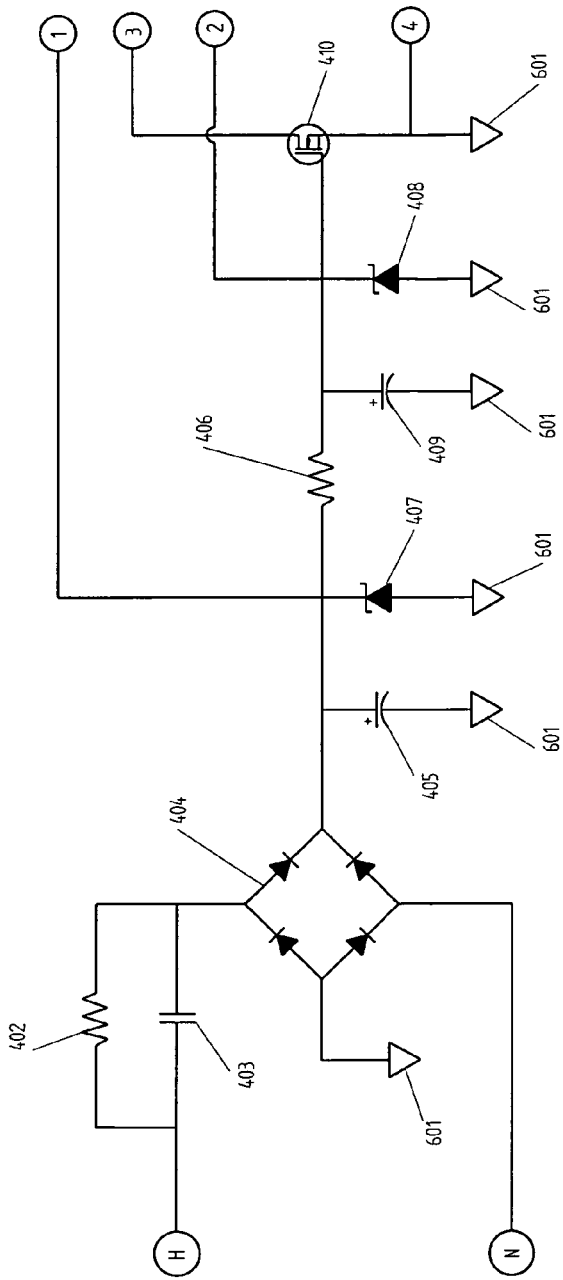
FIG. 6 shows a Schematic diagram of a night light power supply/trigger circuit.

FIG. 4 shows the actual layout of the component electronic parts of the power supply/trigger circuit 400 that supplies electrical current for the photosensor/photoemitter circuit 500 shown in FIG. 5. The power supply/trigger circuit board 401 is wired, as shown, with the following components: a 1M ohm resistor 402, a 0.68 uf 250V ceramic capacitor 403, a 400V 1A bridge rectifier 404, a 10 uf 50V electrolytic capacitor 405, an 820K ohm resistor 406, a 1N4754 Zener diode 407, a 1N4744 Zener diode 408, a 4.7 uf 50V electrolytic capacitor 409, and a ZVN2106 n-channel mosfet transistor 410. The wire marked H is black and is connected to the hot (black) wire of the 120 volt AC electrical box with a twist cap and the wire marked N is white and is connected to the neutral (white) wire of the 120 volt AC electrical box with a twist cap. The four wires coming off of the right side of the circuit board 401 are labeled (as shown in FIG. 6) as wires 1, 2, 3, and 4, proceeding from bottom to top. These four wires are led through a flexible plastic hollow tubing 411 to a four point receptacle 412, with contact points labeled 1, 2, 3, and 4, proceeding from bottom to top.

FIG. 5 shows the photosensor/photoemitter circuit 500 of this invention. Shown in this figure are the photosensor/photoemitter circuit board 106, the cadmium sulfide photosensor 107, the white light emitting diode 108, and the four-pronged plug 111 with prongs numbered 1, 2, 3, and 4, proceeding from bottom to top. Also shown on the circuit board 106 is a 10K ohm resistor 501. This resistor 501 is an extremely small, flat surface mount resistor which measures 2.0 mm long by 1.0 mm wide by 0.5 mm high. The LED 108 is an extremely small surface mount LED which measures 3.0 mm long by 3.0 mm wide by 1.5 mm high.

Figure 7:
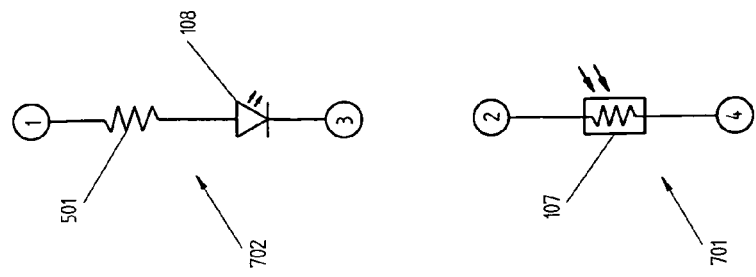
FIG. 7 shows a schematic diagram of a night light photosensor/photoemitter circuit.

In FIG. 6 and FIG. 7 are shown standard schematic diagrams of the power supply/trigger circuit 600 and the photosensor circuit 701 and photoemitter circuit 702 of this invention. The electronic components in these figures have been previously identified in the previous figures. The mechanism by which these electronic components operate together is as follows: The incoming 120V AC is converted to DC by the bridge rectifier 404 and the filtering circuit of capacitor 405 and diode 407. Ground is indicated by the standard symbol 601. The photosensor/photoemitter circuit 500 is connected by the by its four prong plug 111 to the power output of the power supply circuit 600 (or 400) by the receptacle 412. Wires number 1, 2, 3, and 4, of the power supply/trigger circuit shown in FIG. 6 are connected to the corresponding wires 1, 2, 3, and 4, in the photosensor/photoemitter circuit shown in FIG. 7.

The cadmium sulfide photosensor 107 has high resistance in low light and low resistance in high light. During daytime standard lighting conditions, the photosensor 107 will have a low resistance, causing the n-channel mosfet transistor 410 to have a low voltage gate source voltage which limits the current going through the drain source junction and the LED 108 will not illuminate. When low light at night is detected, the photosensor 107 will manifest increased resistance and the voltage gate source voltage of the transistor 410 will increase above the gate source threshold voltage allowing current to flow through the drain source junction and the LED 108 will illuminate. Thus, the transistor 410 acts as the heart of the electronic trigger that turns the LED 108 either on or off.

Resistor 501 can be varied to alter the amount of current flowing to the LED 108, resulting in a lower amount of illumination when the LED is in the "on" state. When the LED is turned on at night, it is bright, providing enough light to illuminate not only the end plate itself but also the entire room. When sufficient light is detected by the photosensor 107, the LED will return to its "off" state. The power supply/trigger circuit 400 is insulated by a plastic covering to protect the circuit from accidental grounding. Although only one LED is illustrated in these drawings, the circuit is designed to work with more LEDs simultaneously. Also, although single end plate is displayed in these drawings, this invention also works perfectly well with double, triple or multiple end plates.

The measurements of the parts of this invention are as follows: The end plate bodies 101, 201, and 301 measure 11.5 cm long by 7.0 cm wide by 0.5 cm deep. The power supply/trigger circuit board with attached electronic components measures 4.3 cm long by 1.0 cm wide by 1.0 cm high, with a total volume of 4.3 cubic cm. This power supply/trigger circuit could be made even smaller utilizing surface mount components. The photosensor/photoemitter circuit board 106 measures 4.0 cm long by 1.0 cm wide by 0.5 cm high. The four-prong plug 111 is 1.0 cm high.

Some of the novelties of this invention are that the use of surface mount components in the photosensor/photoemitter circuit allows this circuit to be attached to the back of standard size end plate and allows the photocell and photoemitter to be embedded into the front surface of the said end plate such that the night light end plate can be screwed onto the front of a standard electrical box. In addition to the above is the fact that the power supply/trigger circuit is physically detached from the end plate itself, being connected to the end plate by wires. This aspect of the invention allows the said power/supply circuit to be stored in the back of a standard size electrical box. Furthermore, once the power supply/trigger circuit has been connected by twist caps to the potentially dangerous high 120V AC and safely stored in the back of the electrical box, the more safe power supply/trigger circuit wires going to the night light end plate itself can be easily plugged into or unplugged from the said end plate.

The night light end plate of this invention can be installed to replace a standard electrical end plate in the following manner: The electrical power going to the relevant electrical box is shut off. The existing end plate (blank, outlet, or switch type) is removed. A circuit tester is used to test the wires to make sure that there is no residual current flowing through the 120V wires. Screws holding the existing outlet or switch, to the electrical box are removed. The wires that connect to an outlet or switch are found. These wires are a black (hot) wire, a white (neutral wire, and a green (ground) wire. Normally these wires will have twist caps. These twist caps are removed. The black (hot) wire from the night light power supply circuit 400 is twisted to connect with the black (hot) wire from the electrical box. The white (neutral) wire from the power supply circuit 400 is twisted to connect with the white (neutral) wire from the electrical box. The twist caps are reinstalled to make tight connections with the aforementioned wires. The power supply/trigger circuit is tucked into the back of the electrical box, leaving the 4 pin receptacle 412 hanging out of the electrical box. A standard 120V AC electrical box measures 9.5 cm high by 5.5 cm wide by 8.2 cm deep, a total volume of 428.45 cubic cm, so that the power supply/trigger circuit, with a total volume of 4.3 cubic cm, fits easily into the back of the electrical box, since the power supply/trigger circuit occupies approximately only one tenth of the volume of the electrical box. The outlet (which measures 6.7 cm by 3.5 by 1.5 cm) or switch (which measures 6.3 cm by 1.8 cm by 2.0 cm) is reinstalled with the appropriate wires and twist cap connectors. The four prong connector 111 of the photosensor/photoemitter circuit 500 is plugged into the four pin receptacle 412 of the power supply/trigger circuit 400. The end plate body (101, 201, or 301), with its attached photosensor/photoemitter circuit 500 is then screwed onto the front of the electrical box. The electrical power flowing to the electrical box is then turned back on and the night light end plate is checked for proper operation. Covering the photocell 107 with an opaque object automatically turns the LED 108 on and uncovering the photocell 107 automatically turns the LED 108 off.

What is claimed is:
1. A night light utilizing surface mount technology comprising: an easily detachable standard size electrical end plate with a near flat profile embedded with a photosensor, a light emitting diode, and a four-pronged plug; said night light further comprising a power supply/trigger circuit comprising a circuit board and a receptacle, wherein said power supply/trigger circuit is physically separate from said electrical end plate and wherein said power supply/trigger circuit is installed inside a standard electrical box and directly connected to the main hot and neutral wires of said standard electrical box; wherein said four-pronged plug of said electrical end plate engages and disengages said receptacle of said power supply/trigger circuit to allow for easy attachment and detachment of said electrical end plate to said power supply/trigger circuit.

2. A night light as described in claim 1 wherein the said electrical end plate is a blank end plate.

3. A night light as described in claim 1 wherein the said electrical end plate is an electrical outlet end plate.

4. A night light as described in claim 1 wherein the said electrical end plate is a switch electrical end plate.

5. A night light as described in claim 1 wherein the said photosensor is a photoresistor.

6. A night light as described in claim 2 wherein the said photosensor is a photoresistor.

7. A night light as described in claim 3 wherein the said photosensor is a photoresistor.

8. A night light as described in claim 4 wherein the said photosensor is a photoresistor.

9. A night light as described in claim 1 wherein the said power supply circuit taps current coming into the said electrical box and wherein the said trigger circuit utilizes a transistor in combination with the said photosensor to function as a light activated voltage switch.

10. A night light described in claim 2 wherein the said power supply circuit taps current coming into the said electrical box and wherein the said trigger circuit utilizes a transistor in combination with the said photosensor to function as a light activated voltage switch.

11. A night light as described claim 3 wherein the said power supply circuit taps current coming into the said electrical box and wherein the said trigger circuit utilizes a transistor in combination with the said photosensor to function as a light activated voltage switch.

12. A night light as described in claim 4 wherein the said power supply circuit taps current coming into the said electrical box and wherein the said trigger circuit utilizes a transistor in combination with the said photosensor to function as a light activated voltage switch.

13. A night light as described in claim 5 wherein the said power supply circuit taps current coming into the said electrical box and wherein the said trigger circuit utilizes a transistor in combination with the said photosensor to function as a light activated voltage switch.

14. A night light as described in claim 6 wherein the said power supply circuit taps current coming into the said electrical box and wherein the said trigger circuit utilizes a transistor in combination with the said photosensor to function as a light activated voltage switch.

15. A night light as described in claim 7 wherein the said power supply circuit taps current coming into the said electrical box and wherein the said trigger circuit utilizes a transistor in combination with the said photosensor to function as a light activated voltage switch.

16. A night light as described in claim 8 wherein the said power supply circuit taps current coming into the said electrical box and wherein the said trigger circuit utilizes a transistor in combination with the said photosensor to function as a light activated voltage switch.

17. A night light as described in claim 1 wherein the intensity of the said light emitting diode can be varied by changing the value of a single resistor in the circuit of the said light emitting diode.

18. A night light as described in claim 17 wherein the said electrical end plate is a blank electrical end plate.

19. A night light as described in claim 17 wherein the said electrical end plate is an outlet electrical end plate.

20. A night light as described in claim 17 wherein the said electrical end plate is a switch electrical end plate.

* * * * *